United States Patent [19]
Hayashi et al.

[11] Patent Number: 4,548,047
[45] Date of Patent: Oct. 22, 1985

[54] EXPANSION VALVE

[75] Inventors: Masakatsu Hayashi, Ibaraki; Kunio Fujie, Tokyo, both of Japan

[73] Assignee: Hitachi, Ltd., Tokyo, Japan

[21] Appl. No.: 440,630

[22] Filed: Nov. 10, 1982

[30] Foreign Application Priority Data

Nov. 11, 1981 [JP] Japan .................................. 56-179674
Nov. 11, 1981 [JP] Japan .................................. 56-179675

[51] Int. Cl.[4] ...................... F16K 31/06; F25B 41/04; F25B 13/00
[52] U.S. Cl. ........................................ 62/160; 251/65; 251/129.05; 251/129.15; 236/75
[58] Field of Search ................. 251/129, 141, 65, 282; 236/75; 62/160

[56] References Cited

U.S. PATENT DOCUMENTS

| 1,625,796 | 4/1927 | Denison | 251/141 X |
| 2,561,922 | 7/1951 | Hall | 251/141 X |
| 3,570,806 | 3/1971 | Sturman et al. | 251/65 |
| 3,684,238 | 8/1972 | Michellone et al. | 251/129 |
| 3,814,376 | 6/1974 | Reinicke | 251/141 X |
| 4,362,027 | 12/1982 | Barbier | 236/75 X |

FOREIGN PATENT DOCUMENTS

| 477091 | 9/1951 | Canada | 251/129 |
| 0055518 | 11/1981 | European Pat. Off. | 251/141 |
| 1442271 | 4/1976 | United Kingdom | 251/141 |

Primary Examiner—Arnold Rosenthal
Attorney, Agent, or Firm—Antonelli, Terry & Wands

[57] ABSTRACT

An expansion valve wherein a plunger slidably fitted in a hollow member for sliding movement and opening and closing valve ports formed in the hollow member is driven by an electromagnetic force, and two chambers defined between opposite ends of the plunger and the hollow member are maintained in communication with each other through a pressure equalization passageway formed in the plunger. The expansion valve is capable of allowing a refrigerant to flow therethrough without any resistance offered to its flow and having ability to allow reversible flow of the refrigerant to take place with high responsiveness.

5 Claims, 11 Drawing Figures

F I G. I

FIG. 9a  FIG. 9b
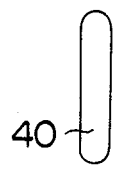
FIG. 10
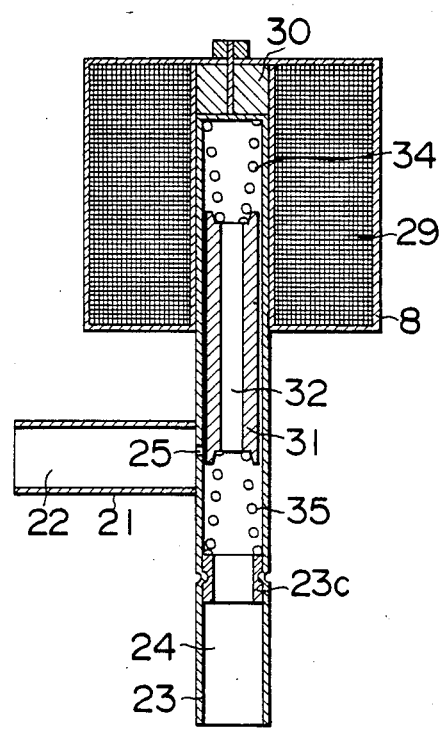

EXPANSION VALVE

BACKGROUND OF THE INVENTION

(1) Field of the Invention

This invention relates to an expansion valve for controlling the flow rate of refrigerant suitable for use in the refrigeration cycle of a room air conditioner, air conditioning unit in packaged form, car air conditioner and heat pump air conditioner for use as room and car air conditioning systems and packaged air conditioning systems.

(2) Description of the Prior Art

In one typical type of flow rate control valve known in the art, a plunger unitary with a valve body is attracted against the biasing force of a spring to an electromagnetic coil mounted on the valve body so as to hold the plunger in a position commensurate with the value of an electric input signal by balancing the force of attraction and the biasing force of the spring.

In this type of control valve, it is possible to control the flow rate by varying the area of a channel in the valve in accordance with the value of an electric input signal passed to the electromagnetic coil. However, magnetic hysteresis would be produced in the plunger which is formed of ferromagnetic material, so that the relation between the input voltage and the displacement of the plunger might greatly vary as the input voltage increases or decreases. Stated differently, even if the input voltage remains equal, the displacement of the plunger would show a variation, with a result that a large difference would be caused to occur in the flow rate.

Thus in this type of flow rate control valve, it is necessary to additionally provide means for correcting the aforesaid error when the valve is put to practical use. This increases cost. Also, when this valve is used with a heat pump air conditioning unit as a control valve, it functions as an expansion valve. In this case, the channel between the valve body and a valve seat is very small and high pressure differential is produced between spaces located upstream and downstream of the valve seat. In a heat pump air conditioning unit in which the direction of flow of the refrigerant is reversed in cooling and heating modes, forces exerted by the pressure differential between these two spaces on the valve body are oriented in opposite directions. Thus great difficulties would be experienced in effecting flow control in the cooling and heating modes by using a single valve, because the balance of forces between the electromagnetic coil and the spring in the cooling mode would greatly vary from that in the heating mode.

In another type of flow rate control valve which is in the form of a thermoelectric expansion valve, an electric signal is converted for one time to heat and this might cause a delay in the response of the valve body or operation. Moreover this type of valve has no ability to allow reversible flow of fluid to take place, and this makes it unfit for use with an air conditioning cycle for effecting space heating and space cooling. Furthermore, the cross-sectional area of the channel is set at a small value at the valve seat and a nozzle to throttle a flow of fluid even when the valve is in full-open position, so that resistance would be offered to the flow of the fluid through the channel.

SUMMARY OF THE INVENTION

(1) Object of the Invention

This invention has been developed for the purpose of obviating the aforesaid disadvantages of the prior art. Accordingly the invention has as its object the provision of an expansion valve capable of not only effecting flow rate control of a refrigerant but also allowing the refrigerant to flow without offering any resistance thereto while having ability to allow reversible flow of the refrigerant to take place with high responsiveness.

(2) Statement of the Invention

The outstanding characteristic of the invention is that a plunger slidably fitted in a hollow member for sliding movement and opening and closing valve ports formed in the hollow member is driven by an electromagnetic force, and two chambers defined between opposite ends of the plunger and the hollow member are maintained in communication with each other through a pressure equalizing passage formed in the plunger.

BRIEF DESCRIPTION OF THE DRAWINGS

FIGS. 8 and 9a and 9b are views illustrating configurations for the valve port of the FIG. 7 embodiment; and FIG. 10 is a vertical sectional view of the expansion valve comprising still another embodiment.

DESCRIPTION OF THE PREFERRED EMBODIMENTS

Figure 1:
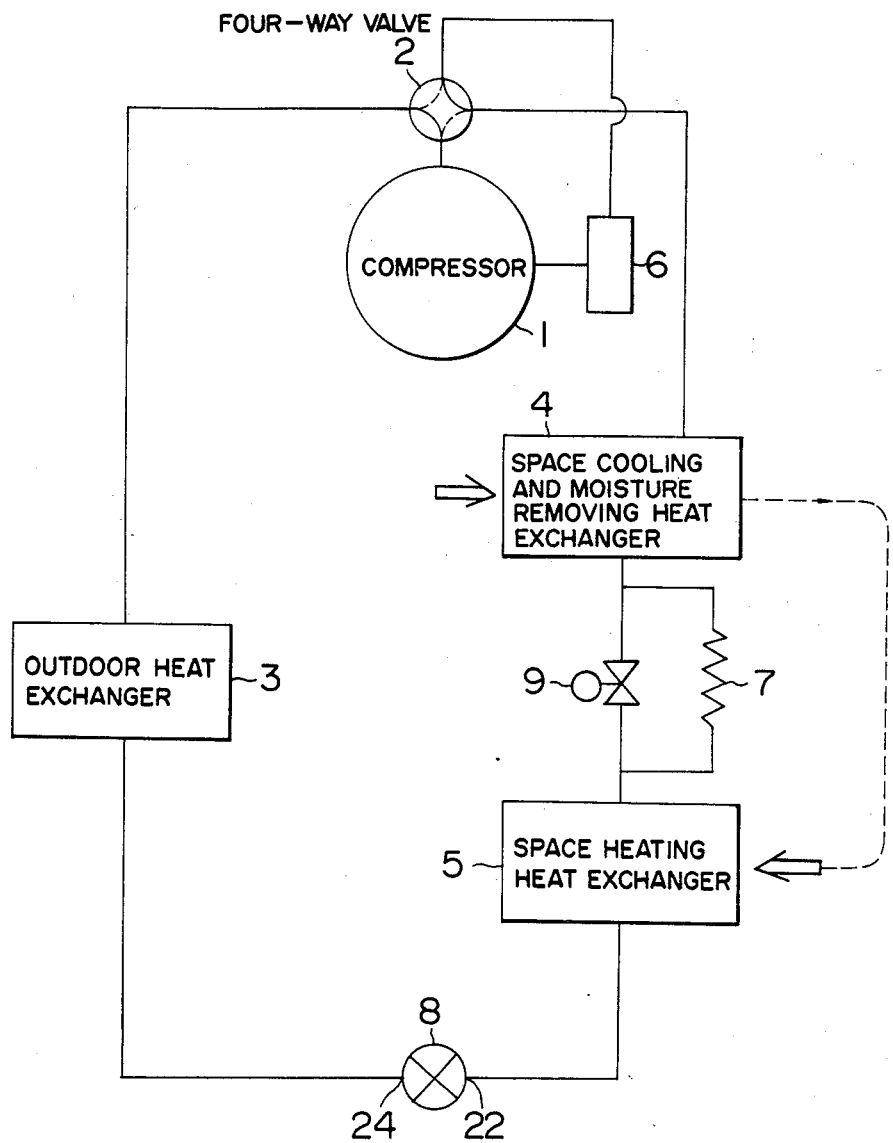
FIG. 1 is a view of one example of the air conditioning cycle having incorporated therein the expansion valve according to the invention.

FIG. 1 shows one example of the air conditioning unit for effecting heating and cooling in which the present invention can be incorporated. In the figure, the reference numerals 1, 2, 3, 4, 5, 6 and 7 designate a compressor, a four-way valve, an outdoor heat exchanger, a space cooling and moisture removing heat exchanger, an indoor space heating heat exchanger, an accumulator and a capillary tube for dry operation, respectively. An expansion valve 8 for both space cooling and space heating having ability to allow reversible flow of fluid to take place is mounted between the outdoor heat exchanger 3 and the space heating heat exchanger 5, and a solenoid valve 9 is mounted between the indoor heat exchangers 4 and 5 in parallel with the capillary tube 7.

Figure 2:
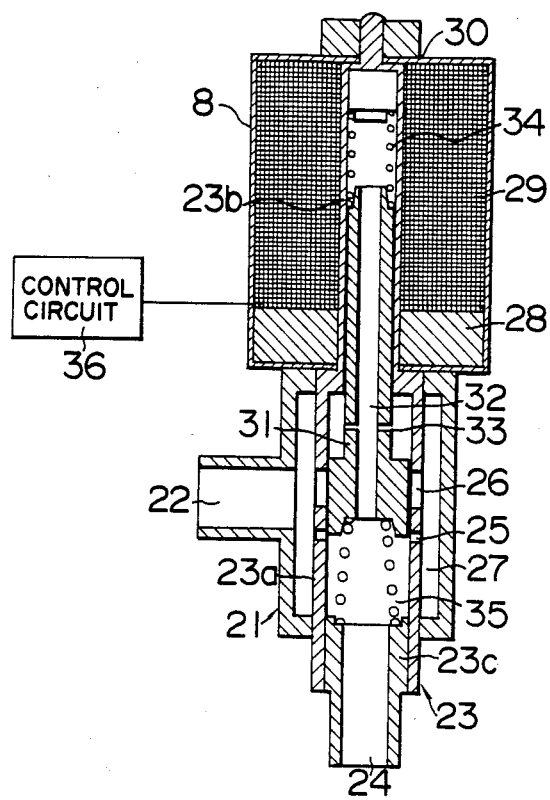
FIG. 2 is a vertical sectional view of the expansion valve comprising one embodiment of the invention.

The expansion valve 8 is constructed as shown in FIG. 2. The valve 8 comprises a valve body 21 having an open end 22, and a hollow shaft 23 extending through the valve body 21 in intimate contact therewith to form a unit, to provide a communication space 27 between it and the valve body 21. The hollow shaft 23 is closed at one end and open as indicated at 24 at a lower end portion 23c thereof. The shaft 23 is formed at a wall of an intermediate portion 23a thereof with a plurality of orifices 25 and communication apertures 26, and has a permanent magnet 28 and an electromagnetic coil 29 attached to an outer wall surface of an upper portion 23b thereof extending upwardly through the valve body 21. The numeral 36 designates a control circuit for controlling an electric current passed to the electromagnetic coil 29.

The numeral 30 designates an attracting member formed of magnetic material, such as electromagnetic stainless steel, secured to the closed one end of the shaft 23. The numeral 31 is a plunger mounted in the hollow shaft 23 for axial sliding movement and biased by springs 34 and 35. The plunger 31 has a pressure equalization passageway formed therein including an axially directed pressure equalization portion 32 formed in its interior and a radially directed pressure equalization passageway portion 33 formed at a wall of its lower portion. The plunger 31 is formed wholly or partly of magnetic material.

Operation of the expansion valve 8 of the aforesaid construction will be described. The plunger 31 repeatedly moves in vertical movement as the electromagnetic force generated by electric input signals applied by the control circuit 36 to the electromagnetic coil 29 balances with the biasing forces of the springs 34 and 35, to open and close the orifices 25 formed in the shaft 31 to continuously control the flow rate per unit hour. By using pulse signals of high frequency as the electric input signals, it is possible to effect control of the degree of opening of the orifices 25 by arbitrarily selecting the number of times the orifice 25 are opened or closed by the plunger 31 or the period of time in which a current is passed to the electromagnetic coil 29 to open or close the orifices 25 by the plunger 31.

The plunger 31 is formed with the pressure equalization passageway including portions 32 and 33 oriented in the axial direction and the radial direction respectively, so that the pressure of the fluid acting on the plunger 31 is substantially equal to the pressure at the open end 24 of the shaft 23. That is, the pressure differential produced in the front and at the rear of the orifices 25 exerts almost no influence on the plunger 31. Thus when a refrigerant is introduced into the interior of the shaft 23 through its open end 24 and led out of the shaft 23 through the orifices 25 and communication space 27 from the open end 22 of the valve body 21, the pressure at the open end 24 of the shaft 23 becomes higher than the pressure at the open end 22 of the valve body 21. When the refrigerant is caused to flow in the reverse direction, the pressure at the open end 24 becomes lower than that at the open end 22.

Pressure differential is thus produced between the open ends 22 and 24 depending on the direction of flow of the refrigerant with the orifices 25 standing at the dividing line between different pressure zones. In this case, the pressure acting on the peripheral surface of the plunger 31 is equal to the pressure at the open end 24 at all times, and production of pressure differential between upper and lower end faces of the plunger 31 is substantially avoided by the existence of the pressure equalization passageway 32 and 33. This makes it possible to use the same input signal as electric signals necessary for actuating the plunger 31 irrespective of the direction of flow of the refrigerant, and also to control the flow rate of the refrigerant with ease regardless of the direction of flow of the refrigerant.

In the space cooling mode of the refrigeration cycle, the plunger 31 only opens and closes the orifices 25, and the communication apertures 26 are not opened. Since the stroke of the plunger 31 is decided by the value of the electric input signals or voltages applied to the electromagnetic coil 29, the opening and closing of the orifices 25 alone can be achieved by using pulse signals of lower value as electric input signals than electric input signals (pulse signals) used for opening and closing the communication apertures 26. Thus flow rate control is effected by varying the time for which the orifices are opened or closed by varying the pulse signals.

In dry operation mode, the communication apertures 26 are opened. That is, the magnetic force generated by the electromagnetic coil 29 is made to act in the same direction as that of the permanent magnet 28 and pulse signals of larger value than those used in performing flow rate control are applied to the coil 29, to move the plunger 31 a greater distance in being attracted to the attracting member 30. By interrupting the supply of the pulse signals to the electromagnetic coil 29 upon completion of attraction of the plunger 31, it is possible to keep the communication apertures 26 open by the action of the attracting member 30.

By opening the communication apertures 26 which are markedly larger in size than the orifices 25, it is possible to allow the refrigerant to flow therethrough without any resistance being offered to its flow. Meanwhile, the communication aperture 26 can be closed if the pulse signals are applied to the electromagnetic coil 29 in such a manner that the magnetic force generated by the electromagnetic coil 29 is oriented in a direction opposite the direction of orientation of the magnetic force generated by the permanent magnet 28, to bring the expansion valve 8 to a condition for effecting control of the flow rate of the refrigerant.

In the refrigerant cycle shown in FIG. 1 in which the expansion valve 8 of the aforesaid construction and operation is incorporated, the solenoid valve 9 is opened and the four-way valve 2 is switched to a broken line position. This allows a refrigerant of high temperature discharged from the compressor 1 to flow into the indoor heat exchangers 4 and 5 and release heat into the air in the space to be heated, so that the refrigerant is condensed and changes into a liquid state when it flows into the expansion valve 8. After having its flow rate controlled to a desired level, the refrigerant flowing into the expansion valve 8 is introduced into the outdoor heat exchanger 3 and absorbs heat from the outdoor air, so that it vaporizes and changes to a gaseous state before being drawn by suction into the compressor 1 through the four-way valve 2. When space cooling is to be performed, one has only to change the four-way valve 2 to a solid line position and cause the refrigerant to flow in a direction opposite the direction in which it has been described as flowing in the space heating mode.

In dry operation mode, the solenoid valve 9 is closed and the communication apertures 26 of the expansion valve 8 are opened. This allows the refrigerant to flow from the outdoor heat exchanger 3 to the indoor heat exchanger 5 through the expansion valve 8 without any substantial loss of pressure. At the indoor heat exchanger 5, the refrigerant heats air in the space to be heated. Then the refrigerant flows into the indoor heat exchanger 4 after having its pressure reduced by the capillary tube 7. The refrigerant flowed into the indoor heat exchanger 4 cools the air and removes moisture from the air before being drawn by suction into the compressor 1 through the four-way valve 2 and a accumulator 6. As a result, the air in the space is cooled and has its moisture removed at the indoor heat exchanger 4 before being reheated at the indoor heat exchanger 5 as indicated by an arrow, so that the air shows almost no change in temperature and only moisture removal is effected.

Figure 3:
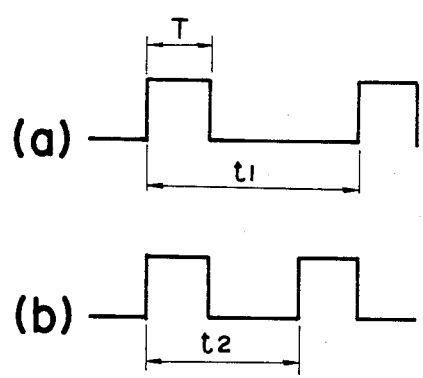
FIGS. 3 and 4 show examples of a pulse electric current for driving the expansion valve shown in FIG. 2.
Figure 4:
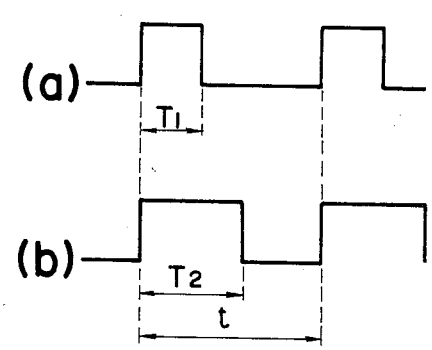

The pulse signals used for effecting control of the flow rate of a refrigerant by varying the degree of opening of the orifices 25 formed in the shaft 23 of the expansion valve 8 are those which, as shown in FIGS. 3(a) and 3(b), have a constant open-time or closed-time T of the orifices 25 in the shaft 23 and a variable number of times (frequencies) $t_1$ and $t_2$ thereof. As an example, T may have a value in the range between 20 and 30 ms. As shown in FIGS. 4(a) and 4(b), the pulse signals may have a constant frequency t while its open-time or closed-time or duty may be varied from $T_1$ to $T_2$. By using the pulse signals referred to hereinabove, the expansion valve 8 is entirely free from influences of hysteresis that have created a problem in the prior art. This makes it possible to continuously vary the degree of opening of the valve in accordance with the pulse signals as shown in FIG. 5 to obtain an arbitrarily selected flow rate Q of the refrigerant.

Figure 5:
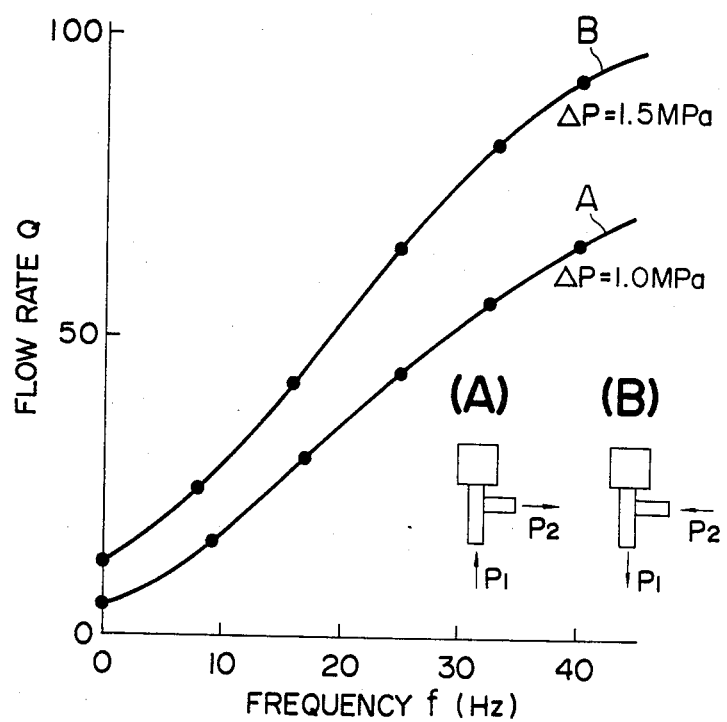
FIG. 5 is a diagrammatic representation of the operation characteristics of the expansion valve shown in FIG. 2.

In FIG. 5, A represents a space cooling operation in which the difference $\Delta P$ in the pressure $P_1$ and $P_2$ applied to the open ends 22 and 24 was 10 MPa. B indicates a space heating operation in which the difference $\Delta P$ between the pressure $P_1$ and $P_2$ was 1.5 MPa. It will be seen that in either mode the flow rate Q obtained can be made substantially proportional to the frequency f of the pulse signals shown in FIG. 3 by varying the latter in the range between 0 and 40 Hz.

Figure 6:
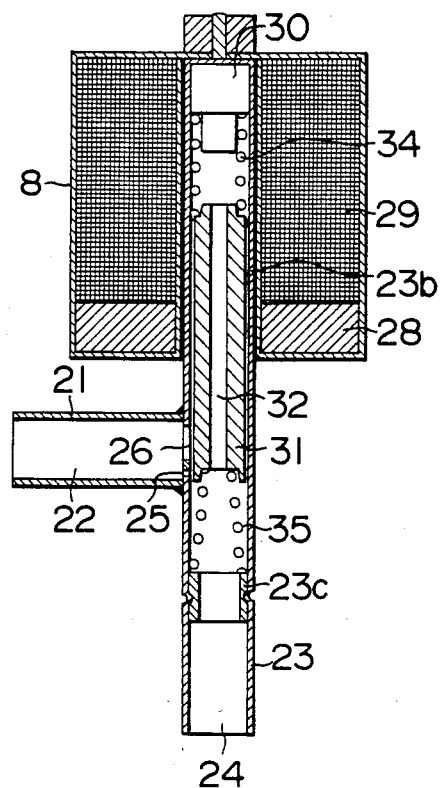
FIGS. 6 and 7 are vertical sectional views of other embodiments of the expansion valve in conformity of the invention.

FIG. 6 shows another embodiment in which the valve body 21 is in the form of a cylindrical pipe joined at one end thereof by brazing to the shaft 23 which is also in the form of a cylindrical pipe. The shaft 23 has secured thereto a pipe 23c of smaller length which supports at its upper end one end of the spring 35. There is no communication space between the shaft 23 and the valve body 21, so that the interior of the shaft 23 is in communication with the open end 22 of the valve body 21 through the orifice 25 and communication aperture 26. By using the expansion valve 8 of the aforesaid construction, it is possible to achieve the same effects as achieved by the embodiment shown in FIG. 2.

Figure 7:
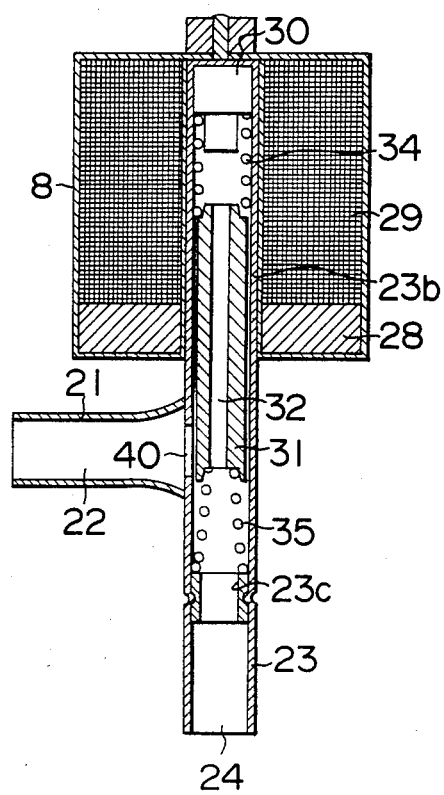
Figure 8:
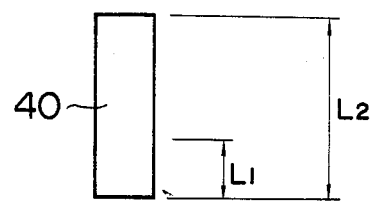

FIG. 7 shows still another embodiment in which the orifices 25 and communication apertures 26 serving as valve openings are replaced by a single slot 40. In this case, one has only to move the plunger 31 in sliding movement in the range of a stroke $L_1$ in effecting flow rate control and in the range of a stroke of $L_2$ in full open condition of the valve, a shown in FIG. 7.

The slot 40 may be either elliptic or triangular as shown in FIG. 9a or FIG. 9b.

When the expansion valve 8 is used in the refrigerant cycle which performs no dry operation, only the orifices 25 may be provided as shown in FIG. 10. In this case, the permanent magnet 28 may be dispensed with to effect control of the stroke of the plunger by means of the electromagnetic coil 29 alone.

When the plunger 31 is small in diameter and no pressure equalization passageway can be formed, one has only to use an external pressure equalization pipe, not shown, to lead the pressure at the open end 24 of the shaft 23 to the upper surface side of the plunger 31.

From the foregoing description, it will be appreciated that according to the invention it is possible, by providing the shaft with the orifices and the communication apertures, to effect not only the flow rate control of a refrigerant but also to allow the refrigerant to flow without any resistance offered thereto. Also the invention provides the expansion valve with ability to allow reversible flow of the refrigerant to take place by making it possible to readily control the flow rate of the refrigerant irrespective of the direction of flow of the refrigerant, so that control can be effected both in the cooling and heating modes by using the single valve. In the invention, electric input signals applied to the electromagnetic coil are not converted into heat, and the plunger is directly moved by a magnetic force created by the electric input signals, so that the response of the plunger can be expedited, thereby enabling rise performance of a refrigerating apparatus to be improved.

What is claimed is:

1. An expansion valve for controlling the flow of a refrigerant in the refrigeration cycle of a heat pump air conditioner unit including indoor and outdoor heat exchangers and a four-way valve for changing the direction of flow of a refrigerant in said air conditioner according to space heating, space cooling and dry operation modes, said expansion valve comprising:

a hollow shaft having a first opening connected to said indoor heat exchanger;

a hollow member having a second opening connected to said outdoor heat exhanger and valve port means communicating said first and second openings with each other, a plunger in sliding engagement in a hollow portion of said hollow member for sliding movement to open and close said valve port means, said plunger being formed of magnetic material at least in part, and said valve port means of said hollow member having an opening extending in a direction of the sliding movement of said plunger, the diameter of the second opening of said hollow member being greater than the length of said valve port means opening in the sliding direction; and drive means for said plunger; wherein said plunger drive means comprises an electromagnetic coil secured to the outer side of said hollow member, and a circuit for passing an electric current to said electromagnetic coil, said circuit comprising means for supplying pulse signals of high frequency to said electromagnetic coil, said pulse signals being supplied according to different patterns respectively predetermined for space heating, space cooling and dry operation modes, wherein said plunger drive means comprises a permanet magnet in addition to said electromagnetic coil, wherein said valve port means opening is constituted by a single slot extending in the direction of movement of said plunger, wherein said plunger comprises a pressure equalization passageway maintaining two chambers defined between opposite ends of said plunger and said hollow portion of said hollow member in communication with each other, and further comprising an attracting member secured to said hollow portion of said hollow member at an end thereof opposite the end at which said second opening is located whereby the position of said plunger can be controlled by controlling the electric current passed to said electromagnetic coil according to space cooling, space heating and dry operation modes irrespective of whether a refrigerant is introduced into the expansion valve through one or the other of said first and second openings.

2. An expansion valve as claimed in claim 1, wherein said hollow shaft and said hollow member are both in the form of pipes, and said hollow shaft is secured to one end thereof to said hollow member in a manner to cover said valve port means.

3. An expansion valve as claimed in claim 1, wherein said valve port means comprise at least one orifice opened and closed by said plunger when it moves in a range of small strokes, and at least one communication aperture opened and closed by said plunger when it moves in a range of large strokes, said communication aperture having a larger cross-sectional area than said orifice.

4. An expansion valve as claimed in claim 1, wherein said plunger is constructed at an end face thereof in a manner to directly open and close said valve port means.

5. In an air conditioner unit comprising indoor and outdoor heat exchangers and a four-way valve for changing the direction of flow of a refrigerant in said air conditioner unit according to space heating, space cooling and dry operation modes of said air conditioner unit, the improvement comprising an expansion valve for controlling the flow of the refrigerant in the air conditioner unit, said expansion valve comprising a hollow shaft having a first opening connected to said indoor heat exchanger, a hollow member having a second opening connected to said outdoor heat exchanger and having valve port means communicating said first and second openings with each other, a plunger in sliding engagement in a hollow portion of said hollow member for sliding movement to open and close said valve port means, said plunger being formed of magnetic material at least in part, the valve port means of said hollow member being large enough to allow the refrigerant to flow therethrough without any resistance being offered to its flow when said valve port means is fully opened by said plunger movement, drive means for said plunger, said plunger drive means comprising an electromagnetic coil secured to the outer side of said hollow member, and a circuit for passing an electric current to said electromagnetic coil, said circuit comprising means for supplying pulse signals of high frequency to said electromagnetic coil, said pulse signals being supplied according to different patterns respectively predetermined for space heating, space cooling and dry operation modes, wherein said plunger drive means comprises a permanent magnet in addition to said electromagnetic coil, wheren said plunger comprises a pressure equalization passageway maintaining two chambers defined between opposite ends of said plunger and said hollow portion of said hollow member in communication with each other, and further comprising an attracting member secured to said hollow portion of said hollow member at an end thereof opposite the end at which said second opening is located whereby the position of said plunger can be controlled by controlling the electric current passed to said electromagnetic coil according to space cooling, space heating and dry operation modes irrespective of whether a refrigerant is introduced into the expansion valve through one or the other of said first and second openings.

* * * * *